United States Patent
Seo et al.

(10) Patent No.: US 9,538,529 B2
(45) Date of Patent: Jan. 3, 2017

(54) METHOD AND APPARATUS FOR TRANSMITTING ACK/NACK SIGNAL IN WIRELESS COMMUNICATION SYSTEM

(71) Applicant: LG ELECTRONICS INC., Seoul (KR)

(72) Inventors: Dong Youn Seo, Gyeonggi-do (KR); Suck Chel Yang, Gyeonggi-do (KR); Joon Kui Ahn, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 288 days.

(21) Appl. No.: 14/359,543

(22) PCT Filed: Nov. 21, 2012

(86) PCT No.: PCT/KR2012/009889
§ 371 (c)(1),
(2) Date: May 20, 2014

(87) PCT Pub. No.: WO2013/077633
PCT Pub. Date: May 30, 2013

(65) Prior Publication Data
US 2014/0328333 A1    Nov. 6, 2014

Related U.S. Application Data

(60) Provisional application No. 61/562,401, filed on Nov. 21, 2011.

(51) Int. Cl.
*H04W 72/04*    (2009.01)
*H04L 1/18*    (2006.01)

(52) U.S. Cl.
CPC ........ *H04W 72/0446* (2013.01); *H04L 1/1812* (2013.01); *H04L 1/1854* (2013.01)

(58) Field of Classification Search
CPC ................................................ H04W 72/0446
See application file for complete search history.

(56) References Cited

U.S. PATENT DOCUMENTS

2010/0322114 A1    12/2010    Li et al.
2011/0090825 A1*    4/2011    Papasakellariou ........ H04L 1/06
370/280

FOREIGN PATENT DOCUMENTS

KR    1020080071099 A    8/2008
KR    1020110103457 A    9/2011

* cited by examiner

*Primary Examiner* — Mohamed Kamara
*Assistant Examiner* — Thad Defauw
(74) *Attorney, Agent, or Firm* — Dentons US LLP

(57) ABSTRACT

The present invention relates to a method and apparatus for transmitting an acknowledgement/not-acknowledgement (ACK/NACK) signal in a wireless communication system. The method includes the steps of: receiving a transmission block; and transmitting an ACK/NACK signal for the transmission block in a first subframe or a second subframe according to the size of the transmission block, wherein, when the size of the transmission block is smaller than or equal to a reference value, the ACK/NACK signal is transmitted in the first frame, when the size of the transmission block is greater than the reference value, the ACK/NACK signal is transmitted in the second subframe, and the second subframe is behind the first subframe in a time domain.

10 Claims, 12 Drawing Sheets

METHOD AND APPARATUS FOR TRANSMITTING ACK/NACK SIGNAL IN WIRELESS COMMUNICATION SYSTEM

This Application is a 35 U.S.C. §371 National Stage entry of International Application No. PCT/KR2012/009889, filed Nov. 21, 2012, which claims the benefit of Priority Application No. 61/562,401 filed Nov. 21, 2011, both of which are incorporated by reference in their entirety herein.

BACKGROUND OF THE INVENTION

Field of the Invention

The present invention relates to a wireless communication system, and more particularly, to a method and an apparatus for transmitting a reception acknowledgment for a hybrid automatic repeat request of a user equipment in a wireless communication system.

Related Art $3^{rd}$ generation partnership project (3GPP) long term evolution (LTE) (hereinafter, referred to as LTE) is an influential next-generation wireless communication system standard. In the LTE, when a base station transmits downlink data to a user equipment, the base station first transmits scheduling information on a downlink data channel through a control channel, allocates the downlink data channel according to the scheduling information, and transmits the downlink data through the allocated downlink data channel. The user equipment transmits to the base station reception acknowledgement/non-acknowledgement (ACK/NACK) of the downlink data and the base station may transmit new downlink data or retransmit pretransmitted downlink data according to the ACK/NACK. Such a data transmission scheme is called a hybrid automatic repeat request (HARQ). The HARQ includes synchronous and asynchronous HARQs, and in the case of the synchronous HARQ, synchronization is set between an HARQ process and a subframe, and as a result, new transmission/retransmission of the same HARQ process is performed according to a predetermined timing. On the contrary, in the case of the asynchronous HARQ, the use of the HARQ is directly instructed without the synchronization between the HARQ process and the subframe.

Meanwhile, 3GPP LTE-A (long term evolution-advanced) (hereinafter, referred to as LTE-A) is a next-generation wireless communication system standard developed by improving the LTE. The LTE-A can support low price/low specification user equipments that primarily perform data communications such as meter reading, water level measurement, utilization of a monitoring camera, inventory reporting of a vending machine, and the like. As described above, the low price/low specification user equipments that primarily perform low-capacity data communications are called a machine type communication (MTC) user equipment.

When the MTC user equipment exists in an area supported by the base station, it may be difficult to apply the ACK/NACK timing of the existing HARQ as it is. For example, when the downlink data has a capacity larger than a capacity which the MTC user equipment can process within a specific time, the MTC user equipment may not decode all of the downlink data at the time of transmitting the ACK/NACK.

Further, in spite of not the MTC user equipment, data to be acknowledged/not acknowledged and a time up to the transmission timing of the ACK/NACK are insufficient, and as a result, an ACK/NACK response of the HARQ may not normally be performed during a predetermined time interval.

For example, the LTE-A can support carrier aggregation and support cross carrier scheduling. In the cross carrier scheduling, scheduling information is simultaneously received through a specific cell, but data scheduled by the scheduling information may be received in different cells. In this case, the different cells are not temporally aligned, and as a result, data may be received lately in some cells. In this case, due to an insufficient time between the lately received data and an insufficient time and an ACK/NACK thereof, the lately received data may not normally be decoded.

Alternatively, in the LTE-A, a new control channel allocated to a data domain may be introduced in addition to the existing control channel allocated to a control domain. Since the new control channel may exist in the data domain, a decoding time of data scheduled by the new control channel may be insufficient according to the user equipment.

Therefore, new ACK/NACK transmitting method and apparatus which can be applied to an advanced wireless communication system such as the LTE-A are required.

SUMMARY OF THE INVENTION

An object of the present invention is to provide a method and an apparatus for transmitting an ACK/NACK in a wireless communication system.

In accordance with an aspect of the present invention, a method for transmitting an acknowledgement/not-acknowledgement (ACK/NACK) of a user equipment includes the steps of: receiving a transport block; and transmitting an ACK/NACK signal for the transport block in a first subframe or a second subframe according to the size of the transport block, wherein, when the size of the transport block is equal to or smaller than a preference value, the ACK/NACK signal is transmitted in the first subframe and when the size of the transport block is larger than the reference value, the ACK/NACK signal is transmitted in the second subframe, and the second subframe is behind the first subframe in a time domain.

In accordance with another aspect of the present invention, a method for transmitting an acknowledgement/not-acknowledgement (ACK/NACK) of a user equipment includes the steps of: receiving a transport block; and transmitting an ACK/NACK for the transport block in a predetermined subframe when the size of the transport block is larger than a reference value, and not transmitting the ACK/NACK for the transport block when the size of the transport block is equal to or smaller than the reference value.

In accordance with yet another aspect of the present invention, a user equipment includes: a radio frequency (RF) unit which transmits or receives a radio signal; and a processor connected with the RF unit, wherein the processor receives a transport block and transmits an ACK/NACK for the transport block in a first subframe or a second subframe according to the size of the transport block, and when the size of the transport block is equal to or smaller than a preference value, the ACK/NACK signal is transmitted in the first subframe and when the size of the transport block is larger than the reference value, the ACK/NACK signal is transmitted in the second subframe, and the second subframe is behind the first subframe in a time domain.

An HARQ process can be efficiently performed under a situation in which a data decoding capability is limited. Accordingly, system performance is improved.

DESCRIPTION OF EXEMPLARY EMBODIMENTS

The user equipment (UE) may be fixed or movable and may be called other terms such as a mobile station (MS), a mobile terminal (MT), a user terminal (UT), a subscriber station (SS), a wireless device, a personal digital assistant (PDA), a wireless modem, a handheld device, and the like.

The base station generally represents a fixed station that communicates with the user equipment, and may be called other terms such as an evolved-NodeB (eNB), a base transceiver system (BTS), an access point, and the like.

A communication from the base station to the user equipment is called a downlink DL and a communication from the user equipment to the base station is called an uplink UL. A wireless communication system including the base station and the user equipment may be a time division duplex (TDD) or a frequency division duplex (FDD) system. The TDD system is a wireless communication system that performs uplink and downlink transmission and reception by using different timings in the same frequency band. The FDD system is a wireless communication system that can perform the uplink and downlink transmission and reception simultaneously by using different frequency bands. The wireless communication system may perform the communication by using the radio frame.

Figure 1:
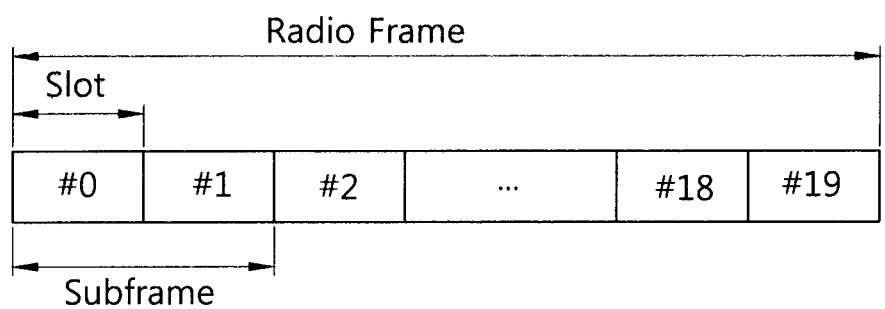
FIG. 1 illustrates a structure of an FDD radio frame.

FIG. 1 illustrates a structure of an FDD radio frame.

The FDD radio frame includes 10 subframes and one subframe two consecutive slots. Slots included in the radio frames are indexed with 0 to 19. A time required to transmit one subframe is a transmission time interval (TTI) and the TTI may be a minimum scheduling unit. For example, the length of one subframe may be 1 ms and the length of one slot may be 0.5 ms.

Figure 2:
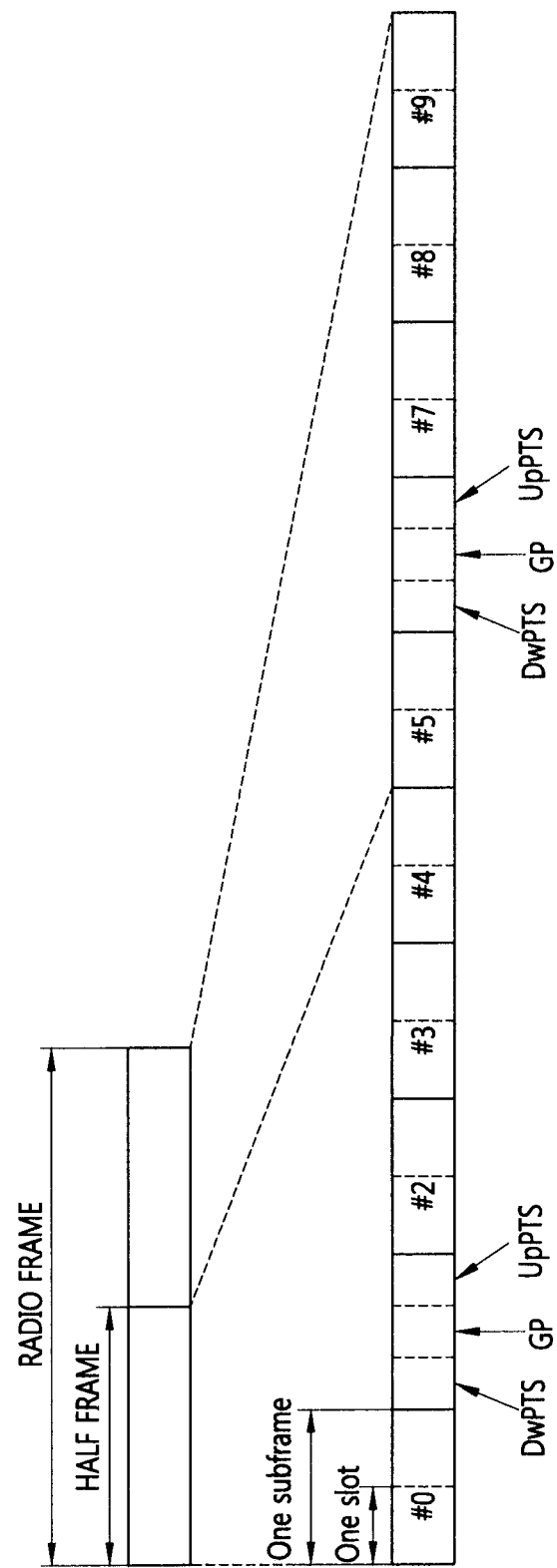
FIG. 2 illustrates a structure of a TDD radio frame.

FIG. 2 illustrates a structure of a TDD radio frame.

Referring to FIG. 2, a subframe having index #1 and index #6 is called a special subframe and includes a downlink pilot time slot (DwPTS), a guard period (GP), and an uplink pilot time slot (UpPTS). The DwPTS is used in initial cell search, synchronization, or channel estimation in the user equipment. The UpPTS is used to match channel estimation in the base station and uplink transmission synchronization of the user equipment. The GP is a period for removing an interference which occurs in the uplink due to a multipath delay of the downlink signal between the uplink and the downlink.

In the TDD, a downlink (DL) subframe and an uplink (UL) subframe coexist in one radio frame. Table 1 illustrates one example of a UL-DL configuration of the radio frame.

TABLE 1

| Uplink-downlink configuration | Downlink-to-uplink Switch-point periodicity | Subframe n | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, 'D' represents a DL subframe, 'U' represents a UL subframe, and 'S' represents the special subframe. When the user equipment receives the UL-DL configuration from the base station, the user equipment may know whether each subframe is the DL subframe or the UL subframe in the radio frame. Hereinafter, a UL-DL configuration N (N is any one of 0 to 6) may refer to Table 1.

Figure 3:
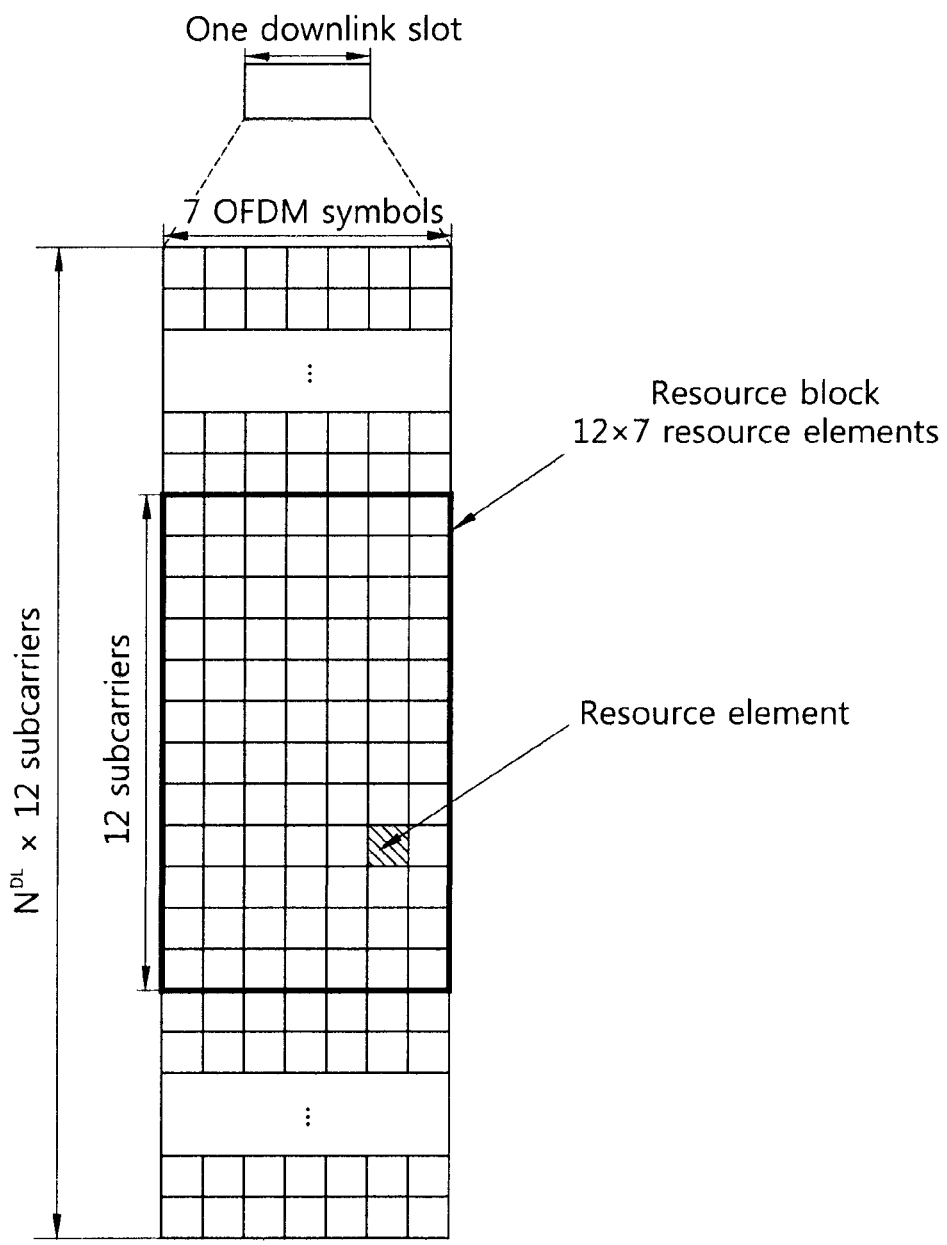
FIG. 3 illustrates one example of a resource grid for one downlink slot.

FIG. 3 illustrates one example of a resource grid for one downlink slot.

Referring to FIG. 3, the downlink slot may include a plurality of orthogonal frequency division multiplexing (OFDM) symbols in a time domain and $N_{RB}$ resource blocks (RBs) in a frequency domain. The resource block as the resource allocation unit includes one slot in the time domain and a plurality of consecutive subcarriers in the frequency domain. The number $N_{RB}$ of resource blocks included in the downlink slot is subordinate to a downlink bandwidth $N^{DL}$ set in a cell. For example, in an LTE system, $N_{RB}$ may be any one of 6 to 110. A structure of an uplink slot may also be the same as that of the downlink slot.

Each element on the resource grid is called a resource element (RE). The resource element on the resource grid may be identified by a pair of indexes (k,l) in the slot. Herein, k (k=0, . . . , $N_{RB}$×12-1) represents a subcarrier index in the frequency domain and l (l=0, ..., 6) represents an OFDM symbol index in the time domain.

In FIG. 3, it is exemplarily described that one resource block is constituted by 7 OFDM symbols in the time domain and 12 subcarriers in the frequency domain and thus includes 7×12 resource elements, but the number of the OFDM symbols and the number of the subcarriers in the resource block are not limited thereto. The number of the OFDM symbols and the number of the subcarriers may be variously changed depending on the length of a CP, frequency spacing, and the like. As the number of subcarriers in one OFDM symbol, one may be selected and used among 128, 256, 512, 1024, 1536, and 2048.

Figure 4:
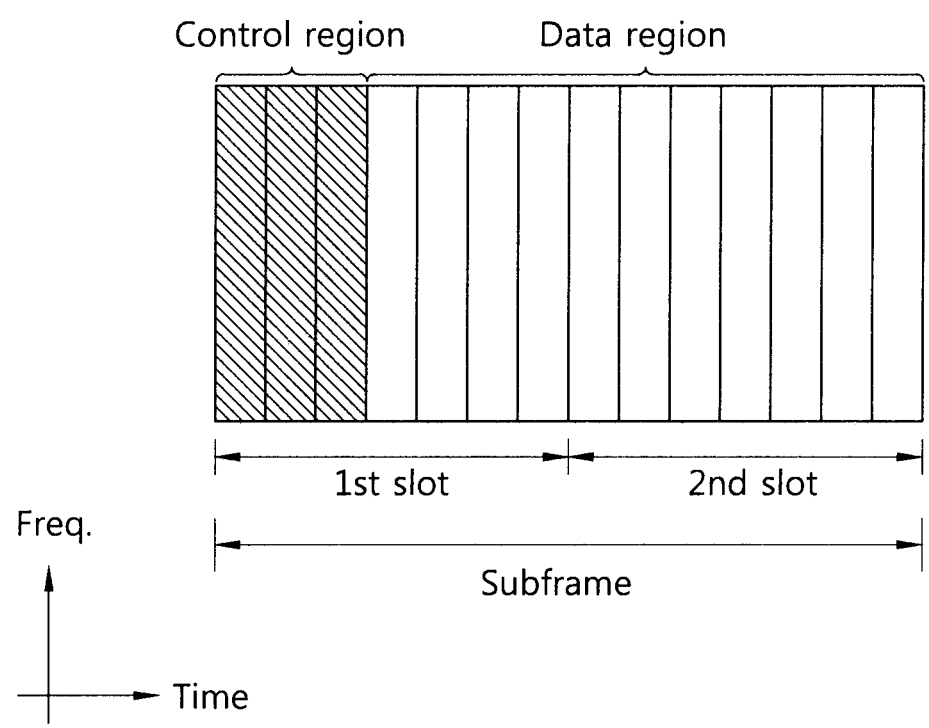
FIG. 4 illustrates a structure of a downlink subframe.

FIG. 4 illustrates a structure of a downlink subframe.

Referring to FIG. 4, the downlink (DL) subframe is divided into a control region and a data region. The control region includes maximum three (maximum four in some cases) precedent OFDM symbols of a first slot in the subframe, but the number of OFDM symbols included in the control region may be changed. A physical downlink control channel (PDCCH) and other control channel are allocated to the control region and a physical downlink shared channel (PDSCH) is allocated to the data region.

As disclosed in 3GPP TS 36.211 V8.7.0, a physical channel in 3GPP LTE may be divided into the physical downlink shared channel (PDSCH) and a physical uplink shared channel (PUSCH) which are data channels, and a physical downlink control channel (PDCCH), a physical control format indicator channel (PCFICH), a physical hybrid-ARQ indicator channel (PHICH), and a physical uplink control channel (PUCCH) which are data channels.

The PCFICH transmitted in a first OFDM symbol of the subframe transports a control format indicator regarding the number (that is, the size of the control region) of OFDM symbols used to transmit control channels in the subframe. The user equipment first receives the CFI on the PCFICH and thereafter, monitors the PDCCH. Unlike the PDCCH, the PCFICH is transmitted through a fixed PCFICH resource of the subframe without using blind decoding.

The PHICH transports a positive-acknowledgment (ACK)/negative-acknowledgement (NACK) signal for an uplink hybrid automatic repeat request (HARQ). An ACK/NACK signal for uplink (UL) data on the PUSCH transmitted by the user equipment is transmitted on the PHICH.

A physical broadcast channel (PBCH) is transmitted in four precedent OFDM symbols of a second slot of the first subframe of the radio frame. The PBCH transports system information required for the user equipment to communicate with the base station and the system information transmitted through the PBCH is called a master information block (MIB). As compared therewith, system information transmitted on the PDSCH instructed by the PDCCH is called a system information block (SIB).

Control information transmitted through the PDCCH is called downlink control information (DCI). The DCI may include resource allocation (also referred to as downlink (DL) grant) of the PDSCH, resource allocation (also referred to as uplink (UL) grant) of the PUSCH, a set of transmission power control commands for individual UEs in a predetermined UE group, and/or activation of a voice over Internet protocol (VoIP). Table 2 shown below exemplifies a DCI format and a usage.

TABLE 2

| DCI format | USAGE |
| --- | --- |
| DCI FORMAT 0 | USED IN SCHEDULING PUSCH |
| DCI FORMAT 1 | USED IN SCHEDULING ONE PDSCH CODWORD |
| DCI FORMAT 1A | USED IN COMPACT SCHEDULING OF ONE PDSCH CODEWORD AND RANDOM ACCESS PROCESS |
| DCI FORMAT 1B | USED IN COMPACT SCHEDULING OF ONE PDSCH CODEWORD HAVING PRECODING INFORMATION |
| DCI FORMAT 1C | USED IN VERY COMPACT SCHEDULING OF ONE PDSCH CODWORD |
| DCI FORMAT 1D | USED IN COMPACT SCHEDULING OF ONE PDSCH CODEWORD HAVING PRECODING AND POWER OFFSET INFORMATION |
| DCI FORMAT 2 | USED IN SCHEDULING PDSCH OF USER EQUIPMENTS SET IN CLOSE LOOP SPATIAL MULTIPLEXING MODE |
| DCI FORMAT 2A | USED IN SCHEDULING PDSCH OF USER EQUIPMENTS SET IN OPEN LOOP SPATIAL MULTIPLEXING MODE |
| DCI FORMAT 3 | USED IN TRANSMITTING TPC COMMAND OF PUCCH AND PUSCH HAVING 2 BIT POWER ADJUSTMENTS |
| DCI FORMAT 3A | USED IN TRANSMITTING TPC COMMAND OF PUCCH AND PUSCH HAVING 1 BIT POWER ADJUSTMENT |
| DCI FORMAT 4 | USED IN SCHEDULING PUSCH IN ONE UL CELL IN MULTI ANTENNA TRANSMISSION MODE |

Figure 5:
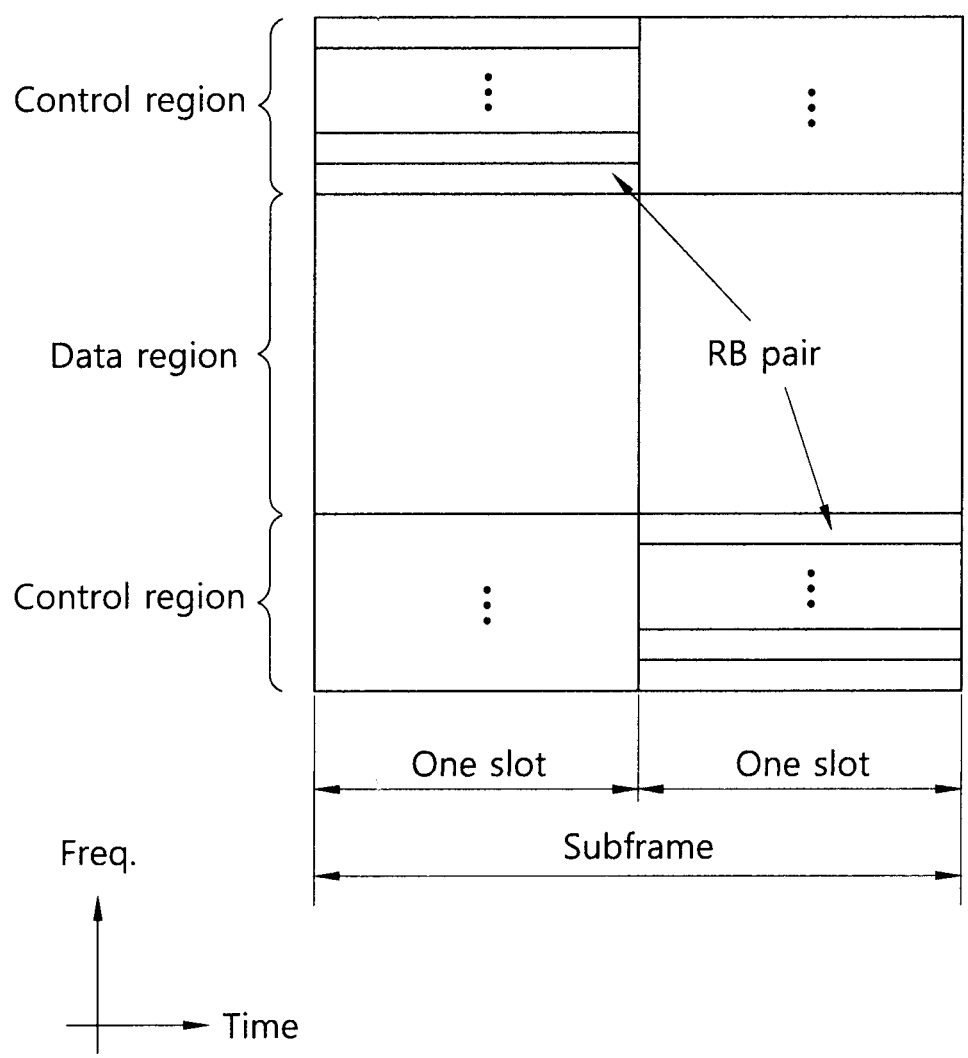
FIG. 5 illustrates a structure of an uplink subframe.

FIG. 5 illustrates a structure of an uplink subframe.

Referring to FIG. 5, the uplink subframe may be divided into a control region to which the physical uplink control channel (PUCCH) transporting the uplink control information is allocated and a data region to which the physical uplink shared channel (PUSCH) transporting user data is allocated, in the frequency domain.

The PUCCH is allocated as a pair of RBs in the subframe. The RBs that belong to the pair of RBs occupy different subcarriers in first and second slots, respectively. The pair of RBs have the same resource block index m.

According to the 3GPP TS 36.211 V8.7.0, the PUCCH supports multiple formats. PUCCH having different bit numbers for each subframe may be used according to a modulation scheme subordinate to the PUCCH format.

PUCCH format 1 is used to transmit a scheduling request (SR), PUCCH format 1a/1b is used to transmit the ACK/NACK signal for the HARQ, PUCCH format 2 is used to transmit a CQI, and PUCCH format 2a/2b is used to simultaneously transmit the CQI and the ACK/NACK signal. PUCCH format 3 may be used to transmit a plurality of ACKs/NACKs.

In the 3GPP LTE, a resource index $n^{(1)}_{PUCCH}$ is defined in order for the user equipment to configure the PUCCH. The resource index is defined as $n^{(1)}_{PUCCH}=n_{CCE}+N^{(1)}_{PUCCH}$, $n_{CCE}$ is No. of a first CCE used to transmit the corresponding PDCCH (that is, PDCCH including downlink resource allocation used to receive the downlink data corresponding to the ACK/NACK signal), and $N^{(1)}_{PUCCH}$ is a parameter which the base station notifies to the user equipment as a higher layer message.

The resource that transmits the ACK/NACK may be instructed by the $n^{(1)}_{PUCCH}$ and in this case, implicit mapping of the CCE and the ACK/NACK resource is used.

Hereinafter, a carrier aggregation system will be described. The carrier aggregation system is also referred to as a multiple carrier system or a multiple cell system.

The 3GPP LTE system supports a case in which a downlink bandwidth and an uplink bandwidth are set to be different from each other, but this premises one component carrier (CC). The 3GPP LTE system supports maximum 20 MHz and the uplink bandwidth and the downlink bandwidth may be different from each other, but the 3GPP LTE system supports only one CC to each of the uplink and the downlink.

On the contrary, carrier aggregation supports a plurality of CCs. For example, when five CCs are allocated as granularity of the unit of the carrier having a bandwidth of 20 MHz, a bandwidth of maximum 100 MHz may be supported.

One DL CC or a pair of UL CC and DL CC may correspond to one cell. Therefore, the user equipment that communicates with the base station through a plurality of DL CCs may receive a service from a plurality of serving cells.

Figure 6:
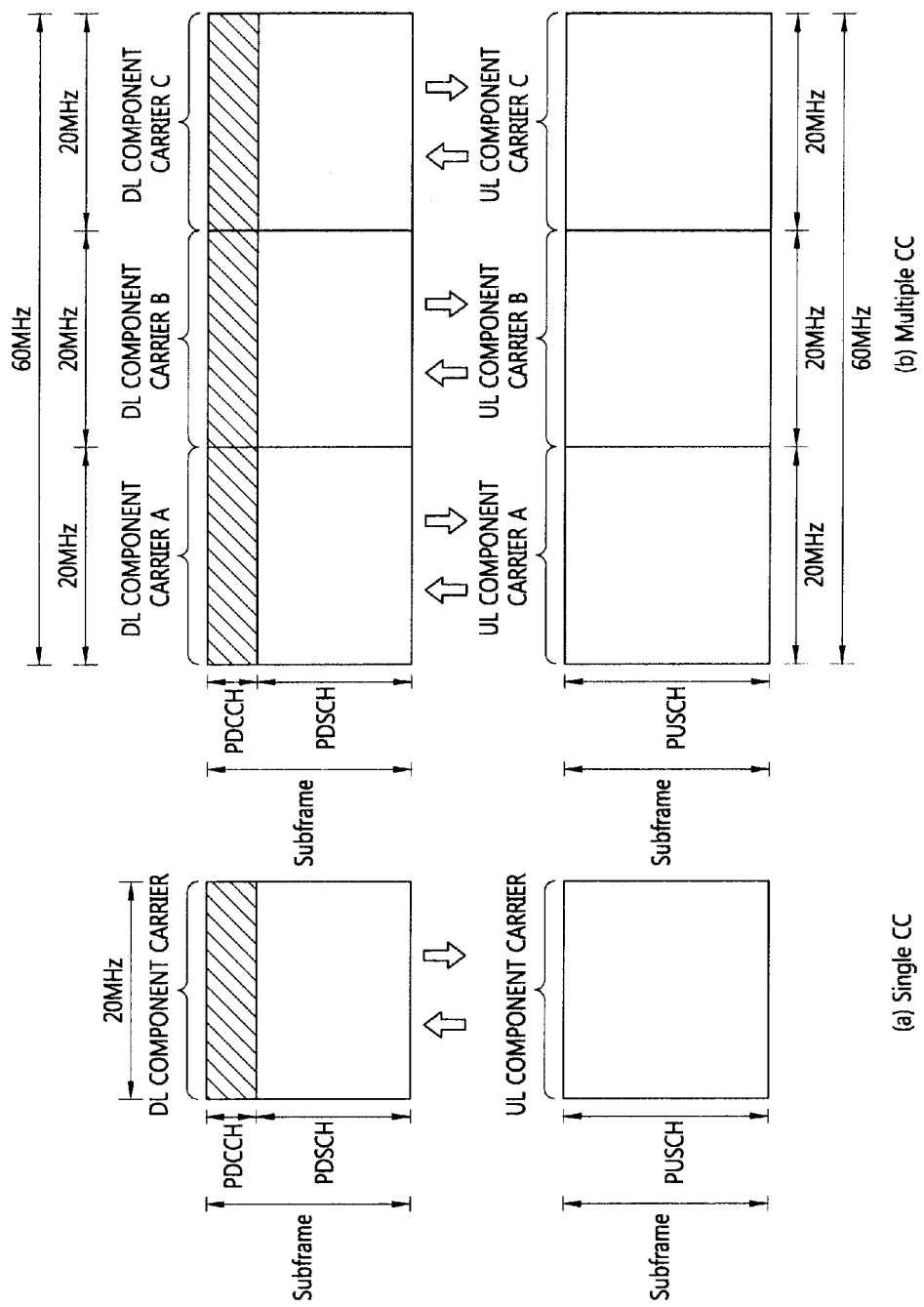
FIG. 6 illustrates a comparative example of a single carrier system and a carrier aggregation system.

FIG. 6 illustrates a comparative example of a single carrier system and a carrier aggregation system.

A carrier aggregation system (FIG. 6(b)) has each of three DL CCs and UL CCs, but the numbers of DL CCs and UL CCs are not limited. In each DL CC, the PDCCH and the PDSCH may be independently transmitted and in each UL CC, the PUCCH and the PUSCH may be independently transmitted. Alternatively, the PUCCH may be transmitted through only a specific UL CC.

Since three pairs of the DL CC and the UL CC are defined, the user equipment may receive the service from three serving cells.

The user equipment may monitor the PDCCH in the plurality of DL CCs and receive a DL transport block simultaneously through the plurality of DL CCs. The user equipment may transmit a plurality of UL transport blocks simultaneously through a plurality of UL CCs.

A pair of DL CC #A and UL CC #A may become a first serving cell, a pair of DL CC #B and UL CC #B may become a second serving cell, and a pair of DL CC #C and UL CC #C may become a third serving cell. Each serving cell may be identified through a cell index (CI). The CI may be unique in the cell or user equipment-specific.

The serving cell may be divided into a primary cell (PCell) and a secondary cell (SCell). The primary cell is a cell designated as the primary cell while the user equipment performs an initial connection establishment process or starts a connection reestablishment process, or during a handover process. The primary cell is also referred to as a reference cell. The secondary cell may be set after an RRC connection is established and may be used to provide an additional radio resource. At least one primary cell may be continuously set and the secondary cell may be add/modified/cancelled by higher layer signaling (e.g., an RRC message). A CI of the primary cell may be fixed. For example, a lowest CI may be designated as the CI of the primary cell.

The primary cell is constituted by a downlink primary component carrier (DL PCC) and an uplink primary component carrier (UL PCC) in terms of a component carrier. The secondary cell may be constituted by only a downlink secondary component carrier or a pair of the DL SCC and an uplink secondary component carrier (UL SCC), in terms of the component carrier.

Hereinafter, ACK/NACK transmission for the HARQ in 3GPP LTE time division duplex (TDD) will be described.

In the TDD, the DL subframe and the UL subframe coexist in one radio frame unlike frequency division duplex (FDD). In general, the number of UL subframes is smaller than the number of DL subframes. Accordingly, against insufficient UL subframes for transmitting the ACK/NACK signal, it is supported that a plurality of ACK/NACK signals for downlink data (that is, DL transport blocks) received in the plurality of DL subframes is transmitted in one UL subframe.

In a table shown below, a DL subframe n-k associated with a UL subframe n depending on the UL-DL configuration, herein, k∈K, M represents the number of components of a set K.

TABLE 3

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

If an ACK/NACK for data (for example, a downlink data channel (transport block) or a control channel requiring the ACK/NACK) received in the DL subframe n is transmitted in a UL subframe n+k(n), the k(n) may be expressed as shown in the following table.

TABLE 4

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | 4 | 6 | | | 4 | |
| 1 | 7 | 6 | | | 4 | 7 | 6 | | | 4 |
| 2 | 7 | 6 | | 4 | 8 | 7 | 6 | | 4 | 8 |
| 3 | 4 | 11 | | | | 7 | 6 | 6 | 5 | 5 |
| 4 | 12 | 11 | | | 8 | 7 | 7 | 6 | 5 | 4 |
| 5 | 12 | 11 | | 9 | 8 | 7 | 6 | 5 | 4 | 13 |
| 6 | 7 | 7 | | | | 7 | 7 | | | 5 |

In Table 4, when the user equipment receives the PDSCH or the PDCCH (for example, a DL SPS cancellation PDCCH) requiring the ACK/NACK response, the ACK/NACK is transmitted in the subframe n+k(n) and respective values of Table 4 represent the k(n) value. For example, in the case where the UL-DL configuration is 0, when the PDSCH is received in subframe 0, the ACK/NACK is transmitted in subframe 4 after four subframes. The user equipment requires a specific time in order to transmit the ACK/NACK after receiving the PDSCH or the DL SPS cancellation PDCCH. Hereinafter, a minimum value of the specific time is expressed as $k_{min}$ and a value thereof may be four subframes. In Table 4, referring to the time of transmitting the ACK/NACK, it may be known that the ACK/NACK may be mostly transmitted in an initial uplink subframe in which $k_{min}$ has elapsed. However, a numerical figure underlined in Table 4 does not indicate the initial uplink subframe in which $k_{min}$ has elapsed and indicates an uplink subframe positioned next thereto. The reason is to prevent the ACK/NACK from being transmitted to too many downlink subframes in one uplink subframe.

Hereinafter, the size of the transport block (TB) and a channel coding process in the LTE will be described.

First, the size of the transport block is determined according to $I_{TBS}$ and $N_{PRB}$ as shown in Table 5. However, $N_{PRB}$ may have a predetermined value of 1 to 110 and represents only up to 10 in Table 5.

The LTE-A may support low price/low specification terminals that primarily perform data communications. For example, meter reading, water level measurement, utilization of a monitoring camera, inventory reporting of a vending machine, and the like are primarily performed by the data communications and the data communications are sufficiently performed by even the low price/low specification user equipment. The LTE-A may support the user equipment. Hereinafter, the low price/low specification user equipment is called a machine type communication (MTC) user equipment.

In the case of the MTC user equipment, it may be important to simply/minimize a radio frequency (RF) chain or a channel coding chain in order to reduce manufacturing cost of the user equipment.

In the case of the downlink data channel that operates by the HARQ process, the ACK/NACK response representing whether to normally receive the data by processing the received data is transmitted. In this case, in the HARQ process, a time required to transmit the ACK/NACK

TABLE 5

| $I_{TBS}$ | $N_{PRB}$ | | | | | | | | | |
|---|---|---|---|---|---|---|---|---|---|---|
|  | 1 | 2 | 3 | 4 | 5 | 6 | 7 | 8 | 9 | 10 |
| 0 | 16 | 32 | 56 | 88 | 120 | 152 | 176 | 208 | 224 | 256 |
| 1 | 24 | 56 | 88 | 144 | 176 | 208 | 224 | 256 | 328 | 344 |
| 2 | 32 | 72 | 144 | 176 | 208 | 256 | 296 | 328 | 376 | 424 |
| 3 | 40 | 104 | 176 | 208 | 256 | 328 | 392 | 440 | 504 | 568 |
| 4 | 56 | 120 | 208 | 256 | 328 | 408 | 488 | 552 | 632 | 696 |
| 5 | 72 | 144 | 224 | 328 | 424 | 504 | 600 | 680 | 776 | 872 |
| 6 | 328 | 176 | 256 | 392 | 504 | 600 | 712 | 808 | 936 | 1032 |
| 7 | 104 | 224 | 328 | 472 | 584 | 712 | 840 | 968 | 1096 | 1224 |
| 8 | 120 | 256 | 392 | 536 | 680 | 808 | 968 | 1096 | 1256 | 1384 |
| 9 | 136 | 296 | 456 | 616 | 776 | 936 | 1096 | 1256 | 1416 | 1544 |
| 10 | 144 | 328 | 504 | 680 | 872 | 1032 | 1224 | 1384 | 1544 | 1736 |
| 11 | 176 | 376 | 584 | 776 | 1000 | 1192 | 1384 | 1608 | 1800 | 2024 |
| 12 | 208 | 440 | 680 | 904 | 1128 | 1352 | 1608 | 1800 | 2024 | 2280 |
| 13 | 224 | 488 | 744 | 1000 | 1256 | 1544 | 1800 | 2024 | 2280 | 2536 |
| 14 | 256 | 552 | 840 | 1128 | 1416 | 1736 | 1992 | 2280 | 2600 | 2856 |
| 15 | 280 | 600 | 904 | 1224 | 1544 | 1800 | 2152 | 2472 | 2728 | 3112 |
| 16 | 328 | 632 | 968 | 1288 | 1608 | 1928 | 2280 | 2600 | 2984 | 3240 |
| 17 | 336 | 696 | 1064 | 1416 | 1800 | 2152 | 2536 | 2856 | 3240 | 3624 |
| 18 | 376 | 776 | 1160 | 1544 | 1992 | 2344 | 2792 | 3112 | 3624 | 4008 |
| 19 | 408 | 840 | 1288 | 1736 | 2152 | 2600 | 2984 | 3496 | 3880 | 4264 |
| 20 | 440 | 904 | 1384 | 1864 | 2344 | 2792 | 3240 | 3752 | 4136 | 4584 |
| 21 | 488 | 1000 | 1480 | 1992 | 2472 | 2984 | 3496 | 4008 | 4584 | 4968 |
| 22 | 520 | 1064 | 1608 | 2152 | 2664 | 3240 | 3752 | 4264 | 4776 | 5352 |
| 23 | 552 | 1128 | 1736 | 2280 | 2856 | 3496 | 4008 | 4584 | 5160 | 5736 |
| 24 | 584 | 1192 | 1800 | 2408 | 2984 | 3624 | 4264 | 4968 | 5544 | 5992 |
| 25 | 616 | 1256 | 1864 | 2536 | 3112 | 3752 | 4392 | 5160 | 5736 | 6200 |
| 26 | 712 | 1480 | 2216 | 2984 | 3752 | 4392 | 5160 | 5992 | 6712 | 7480 |

The transport block is channel-coded.

Figure 7:
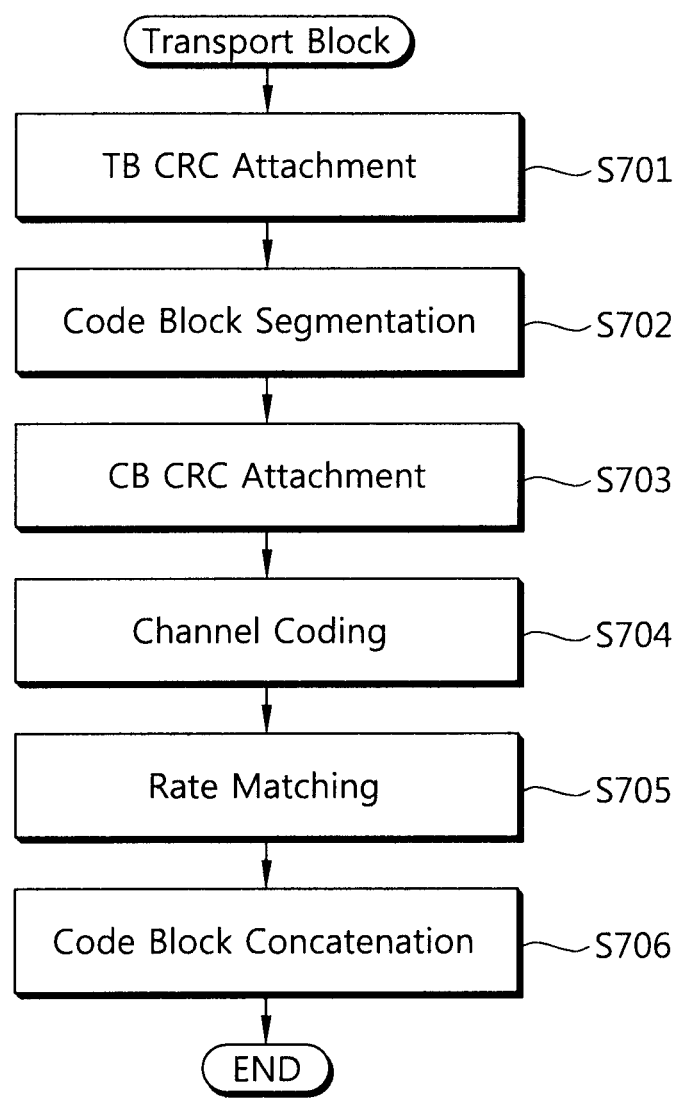
FIG. 7 illustrates a channel coding process (channel coding chain) of a transport block.

FIG. 7 illustrates a channel coding process (channel coding chain) of a transport block.

Referring to FIG. 7, a cyclic redundancy check (CRC) is added to the transport block (TB) (S701), which becomes a code block (CB). When the size of the transport block is represented by A and the size of the CRC is represented by L, B (=A+L) which is a sum of the A and the L is compared with Z (=6144 bits) and when B is equal to or larger than Z, code block segmentation is performed (S702). The CRC is added for each divided code block (S703) and the transport block is channel-coded (S704). As the channel coding, turbo encoding may be used. The divided code block added with the CRC becomes 6144 bits or less. Thereafter, the code block is subjected to rate matching (S705) and code block concatenation (S706).

Hereinafter, the present invention will be described.

response is predetermined. For example, in the case of the LTD FDD, the ACK/NACK is transmitted in a subframe after four subframes in the subframe receiving the PDSCH. In the case of the LTE TDD, the subframe that transmits the ACK/NACK may vary according to the UL/DL configuration for each subframe, but the ACK/NACK is transmitted in the subframe after minimum four subframes in the subframe receiving the PDSCH (this has already been described).

Regardless of the FDD or the TDD, the user equipment decodes the downlink data (that is, the transport block) within a predetermined time and needs to generate/transmit the ACK/NACK therefor. If the size of the transport block is larger than a predetermined value, the user equipment will allocate a plurality of channel coding chains to the transport block and parallelize the transport block in order to decode the transport block within a predetermined time or adjust a processing capability by increasing a clock speed. However, in the case of the MTC user equipment, it is not preferable to set the processing capability to support the maximum transport block size within a predetermined time when an increase of the manufacturing cost, a low use frequency of the transport block having the maximum size, and the like are considered.

Hereinafter, a method for transmitting an ACK/NACK will be described, for a user equipment of which a decoding capability is limited, such as the MTC user equipment. Further, a method for transmitting and receiving data between the user equipment of which the decoding capability is limited, such as the MTC user equipment and the base station will be described. Hereinafter, the user equipment means the user equipment of which the decoding capability is limited, such as the MTC user equipment, but in the present invention, the user equipment is not limited thereto. That is, the present invention may be applied to even a general LTE/LTE-A user equipment.

Figure 8:
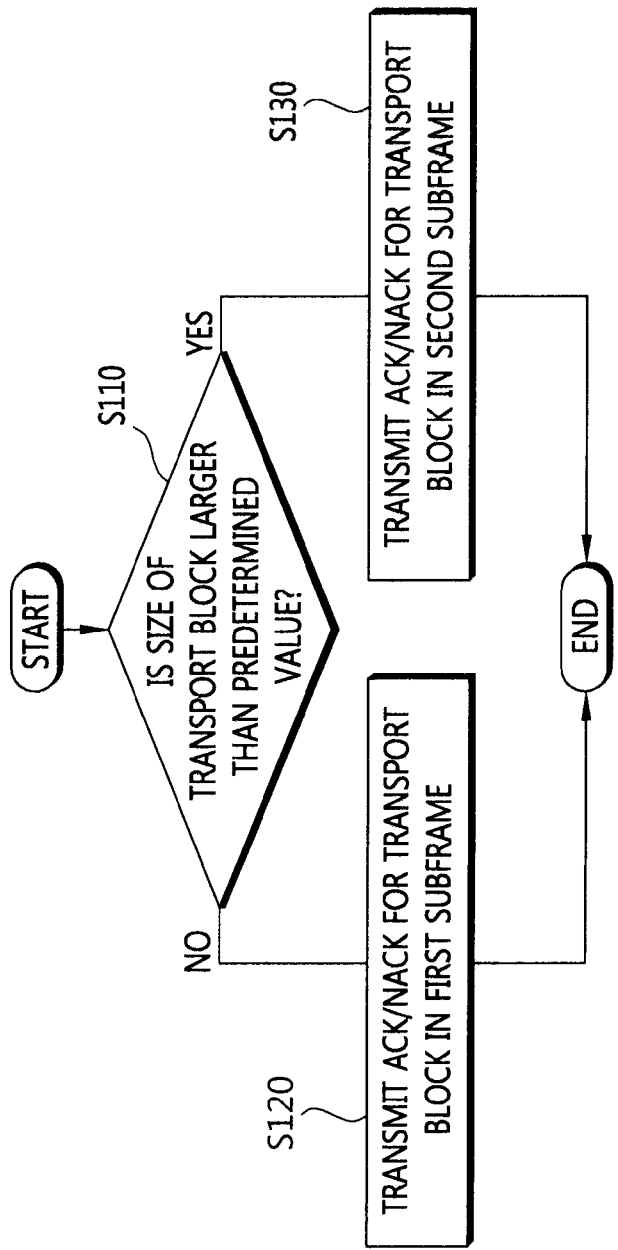
FIG. 8 illustrates a method for transmitting an ACK/NACK of a user equipment according to an embodiment of the present invention.

FIG. 8 illustrates a method for transmitting an ACK/NACK of a terminal according to an embodiment of the present invention.

Referring to FIG. 8, the user equipment judges whether the size of the transport block is larger than a predetermined value (S110). Hereinafter, it will be assumed that the predetermined value is X. X may be 1) the maximum size of the transport block in an initial access and an initial configuration. That is, it may not be known whether the user equipment is the existing user equipment or the MTD user equipment of which the decoding capability is limited in the initial access or the initial RRC configuration. Accordingly, the maximum size of the transport block in the initial access and the initial RRC configuration may be set to X for counter compatibility. As a result, the existing HARQ timing may be maintained in the initial access and the initial RRC configuration.

Alternatively, X may be determined 2) by considering code block segmentation and a code block processing capability of the MTD user equipment. For example, if the block processing capability of the MTC user equipment is one code block, X=Z−L=6144−24=6120 (bits). If the block processing capability of the MTC user equipment is two, X becomes 2*6120 (bits).

If the size of the transport block is equal to or smaller than a predetermined value, the ACK/NACK for the transport block is transmitted in the first subframe (S120). Herein, the first subframe may be a subframe at a minimum ACK/NACK transmittable timing or the existing ACK/NACK transmission subframe. In this sense, the first subframe may be called a default subframe. For example, in the LTE FDD, when the transport block is received in subframe N, an ACK/NACK for the transport block is transmitted in subframe N+4. In this case, the subframe N+4 becomes the first subframe.

More generally, if subframes are consecutively indexed in an ascending order (if a last subframe of a frame is i, a first subframe of a next frame is represented by i+1), when a data unit (data to be acknowledged/not acknowledged, such as the PDSCH, the transport block, or the like) is received, the ACK/NACK for the data channel is transmitted in subframe n+$k_{default}$. In this case, the first subframe becomes the subframe n+$k_{default}$ based on the subframe n. In the FDD, $k_{default}$ may be 4 and in the TDD, $k_{default}$ may be a value of Table 4.

If the size of the transport block is larger than the predetermined value, the ACK/NACK for the transport block is transmitted in the second subframe (S130).

The second subframe as the subframe in which the ACK/NACK is transmitted when the size of the transport block is larger than a predetermined value is a subframe temporally later than the first subframe. For example, the data unit (data to be acknowledged/not acknowledged, such as the PDSCH, the transport block, or the like) is received in the subframe n and when the size of the data unit is larger than the predetermined value, the ACK/NACK for the data unit is transmitted in subframe n+$k_{default}$+$k_{add}$ ($k_{add}$>0).

Alternatively, a method for suspending (stopping) the ACK/NACK transmission may be used. This shows the same effect as setting kadd to infinity and the base station performs scheduling by arbitrarily judging retransmission/new retransmission without the ACK/NACK response. Suspending (stopping) the ACK/NACK transmission as described above may be applied to a case in which the data unit does not reach a predetermined value. The reason is that loss may be small even though data having a small amount is arbitrarily retransmitted or the corresponding data is lost without the ACK/NACK response.

As the $k_{add}$, a value set by a higher layer signal such as a radio resource control (RRC) message may be used. Alternatively, as $k_{add}$, a predetermined specific value (for example, any value of 1, 2, 3, and 4 and this just an example) may be used. $k_{add}$ may be determined by considering the number of code blocks, the size of the transport block, and the like.

In the case of the TDD, an HARQ ACK time delay, that is, k(n) may be set to be larger than $k_{default}$ according to subframe No. n as shown in Table 4. In this case, when k(n) is equal to or larger than $k_{default}$+$k_{add}$, k(n) is followed. That is, a value of min(k(n), $k_{default}$+$k_{add}$) may be used the HARQ ACK time delay. Herein, min(x,y) represents a smaller value (the same value if x and y are the same as each other) of x and y.

Alternatively, k(n) may be limited to schedule a transport block larger than predetermined X only in downlink subframe n in which k(n) is equal to or larger than $k_{default}$+$k_{add}$.

In FIG. 8, an example of directly comparing whether the size of the transport block is larger than the predetermined value X is described, but the present invention is not limited thereto. For example, it may be determined which subframe of the first and second subframes the ACK/NACK is transmitted based on specific $I_{TBS}$ and $N_{PRB}$ of Table 5 instead of X. For example, $I_{TBS}$ has any value of 0 to 26 and $N_{PRB}$ has any value of 1 to 10, and the size of the transport block is determined according to $I_{TBS}$ and $N_{PRB}$. Therefore, the size of the transport block may be instructed by $I_{TBS}$ and $N_{PRB}$. Accordingly, sections for $I_{TBS}$ and $N_{PRB}$ are divided and thereafter, whether the ACK/NACK is transmitted in the first subframe or the second subframe may be discriminated based on a specific section or a specific value.

Figure 9:
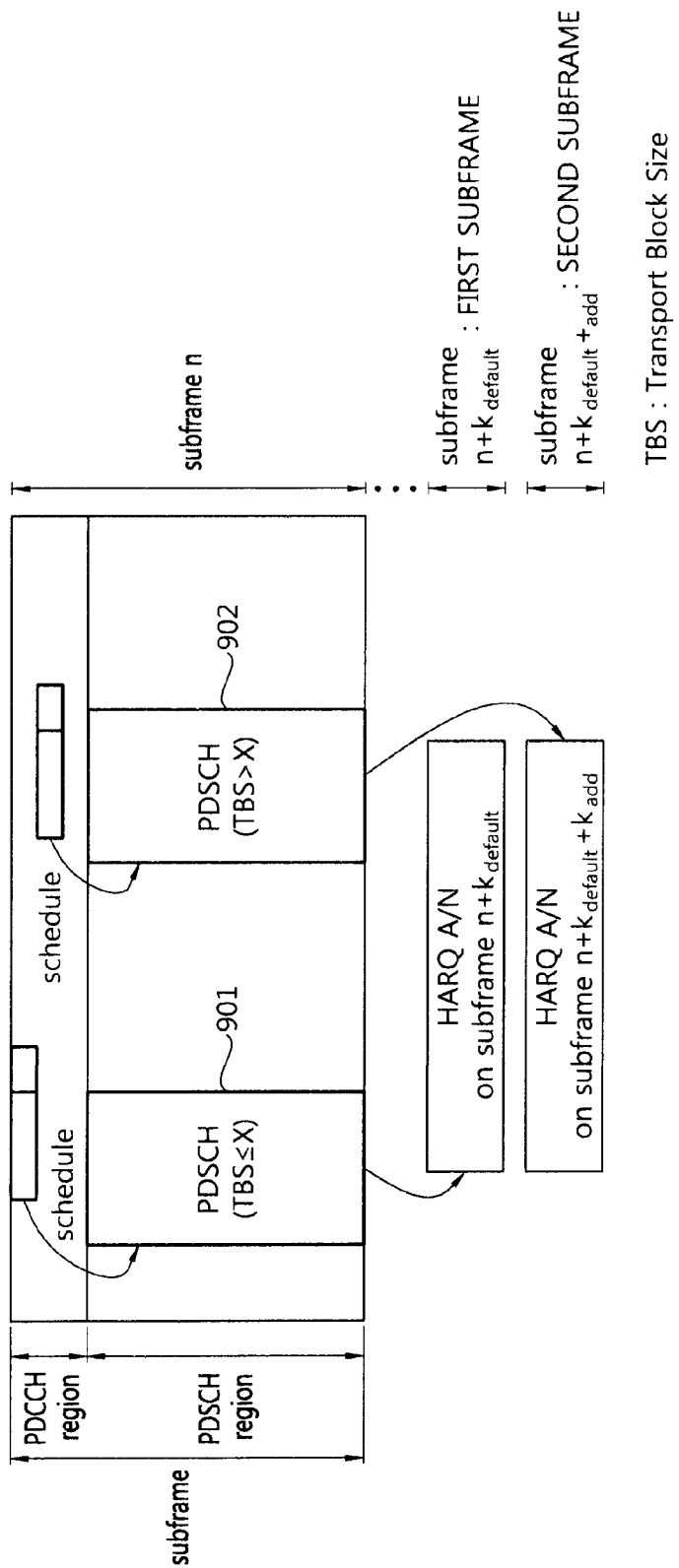
FIG. 9 illustrates data receiving and ACK/NACK transmitting timings of the user equipment by the method of FIG. 8.

FIG. 9 illustrates data receiving and ACK/NACK transmitting timings of the user equipment by the method of FIG. 8.

Referring to FIG. 9, the user equipment may receive a PDSCH 901 in which the size of the transport block is equal to or smaller than X and a PDSCH 902 in which the size of the transport block is larger than X in subframe n.

The user equipment transmits an ACK/NACK for the PDSCH 901 in subframe n+$k_{default}$ and transmits an ACK/NACK for the PDSCH 902 in subframe n+$k_{default}$+$k_{add}$.

Figure 10:
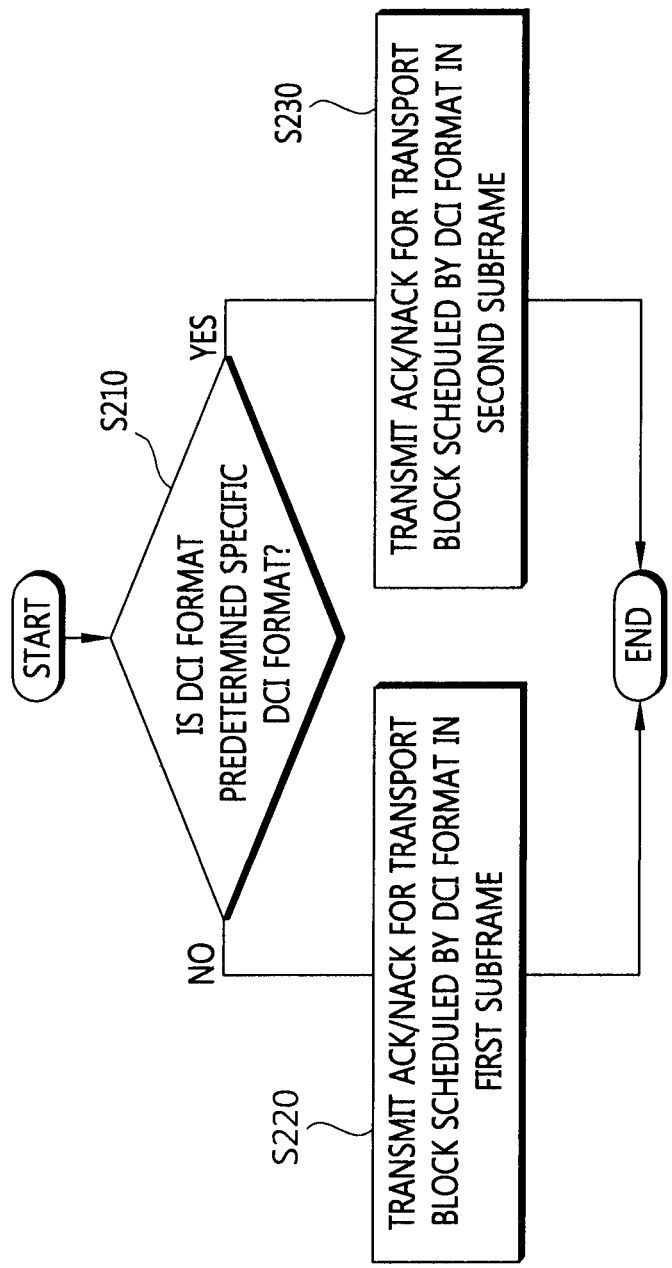
FIG. 10 illustrates a method for transmitting an ACK/NACK of a user equipment according to another embodiment of the present invention.

FIG. 10 illustrates a method for transmitting an ACK/NACK of a user equipment according to another embodiment of the present invention.

Referring to FIG. 10, the user equipment judges whether a DCI format to schedule the PDSCH is a predetermined specific DCI format (S210).

For example, DCI format 1A is called a fallback DCI format as a DCI format which is continuously supported regardless of a downlink transmission mode. The user equipment judges whether the DCI format detected in the PDCCH region is the fallback DCI format and if the detected DCI format is the fallback DCI format, the ACK/NACK for the transport block scheduled by the DCI format is transmitted in the first subframe (S220) and if not so, the ACK/NACK for the transport block scheduled by the DCI format is transmitted in the second subframe (S230).

The size of the transport block scheduled by the fallback DCI format may be limited by a scheduler according to a processing capability of the user equipment.

The present invention in which the transmission timing of the ACK/NACK may be differently applied according to a condition of the size of the data unit to be acknowledged/non acknowledged may be variously extended as described below.

For example, the subframe in which the ACK/NACK is transmitted may be divided according to search space in which the DCI is transmitted. For example, different ACK/NACK transmission timings may be applied by considering which space of a common search space (CSS) which is a common search space for all user equipments in a cell and a user equipment specific search space (USS) which is a search space for a specific user equipment the DCI is received from.

Alternatively, different ACK/NACK transmission timings may be applied by considering whether being scheduled by the PDCCH or an E-PDCCH (enhanced-PDCCH, described below).

Alternatively, different transmission timings may be applied according to a subframe (alternatively, a cell) in which scheduling DCI is transmitted, different transmission timings may be applied according to a subframe (alternatively, a cell) in which a scheduled data channel is transmitted, different transmission timings may be applied according to whether a scheduling scheme being semi-persistent scheduling (SPS) (for example, a PDSCH without a corresponding PDCCH) or dynamic (a PDSCH with the corresponding PDCCH), different transmission timings may be applied according to a type of a radio network temporary identifier (RNTI) added to the DCI, or different transmission timings may be applied according to cross scheduling or non-cross scheduling.

Figure 11:
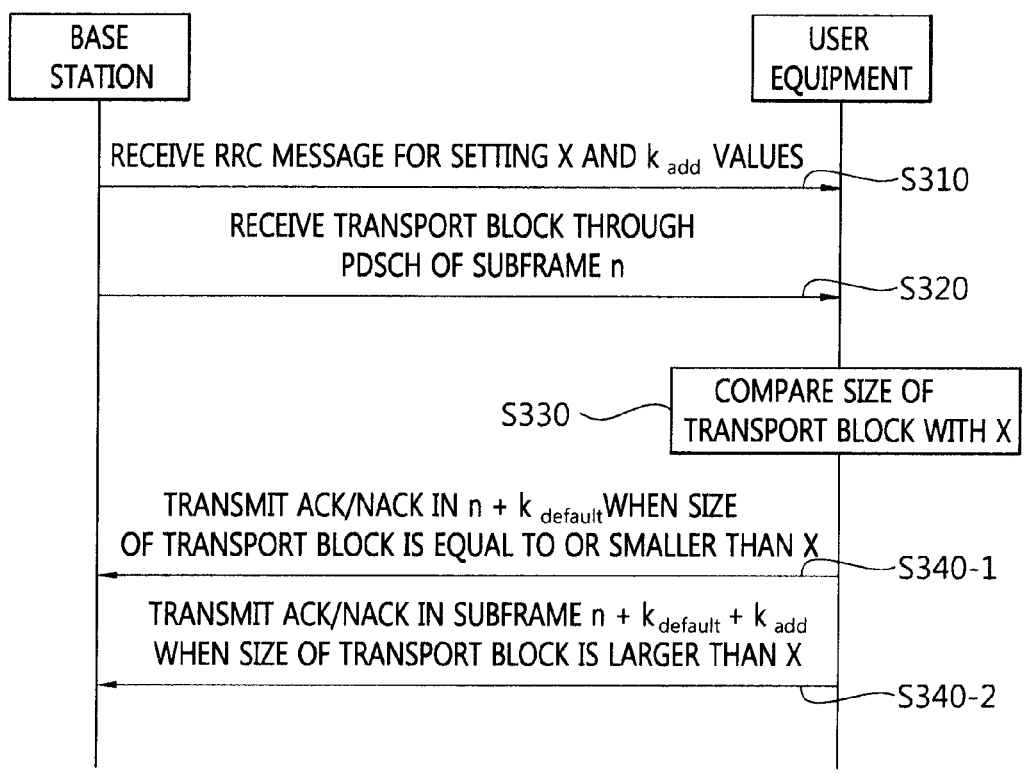
FIG. 11 illustrates a method for transmitting an ACK/NACK according to the present invention.

FIG. 11 illustrates a method for transmitting an ACK/NACK according to the present invention.

Referring to FIG. 11, the user equipment receives the RRC message for setting X and $k_{add}$ through the RRC message (S310).

The user equipment receives the transport block through the PDSCH of the subframe n (S320).

The user equipment compares the size of the transport block with X (S330), transmits the ACK/NACK in the subframe $n+k_{default}$ when the size of the transport block is equal to or smaller than X (S340-1), and transmits the ACK/NACK in the subframe $n+k_{default}+k_{add}$ when the size of the transport block is larger than X (S340-2).

In FIG. 11, a case in which both X and $k_{add}$ are (directly or indirectly) set by the RRC message is exemplified for easy description. However, the present invention is not limited thereto and only one of X and $k_{add}$ may be set by one RRC message. In this case, as a value not set by the RRC message, a predetermined value may be used between the user equipment and the base station. Further, the base station may signal $k_{default}+k_{add}$ by the RRC message instead of $k_{add}$. Alternatively, both X and $k_{add}$ are not RRC-signaled and may be predetermined values.

Meanwhile, the base station may transmit information on the ACK/NACK transmission timing included in the DCI. For example, information on $k_{add}$ may be signaled by configuring a specific field in the DCI or combining states of other fields. That is, the base station may instruct the second subframe to the user equipment through the DCI.

Alternatively, an instructor that disables the ACK/NACK to be transmitted may also be included in the DCI. The user equipment does not transmit the ACK/NACK when it is judged that the ACK/NACK is instructed not to be transmitted through the instructor. The instructor may be included separately from the specific field of the DCI. Alternatively, in the case of the instructor, a value of the specific field itself may serve as the instructor. For example, when the specific field is 2 bits and states of the specific field are '00', '01', '10', and '11' and '00', '01', and '10' may sequentially represent that $k_{add}$ is 0, 1, and 2 and '11' may represent that $k_{add}$ is infinite and thus the ACK/NACK is not transmitted.

In the above, when the size of the transport block is larger than a specific value X, a positive $k_{add}$ value is added as an example, but the present invention is not limited thereto. That is, $k_{add}$ may have a negative value. Alternatively, $k_{minus}$ may be signaled separately from $k_{add}$. For example, when $k_{default}$ is set sufficiently, $k_{minus}$ may be subtracted.

Hereinafter, the resource allocation in the subframe in which the ACK/NACK is transmitted will be described.

In the FDD, when the ACK/NACK is transmitted, the resource allocation may be performed as follows.

1. When $k_{default}$ is applied (that is, when the ACK/NACK for the data unit received in the subframe n is transmitted in the subframe $n+k_{default}$, hereinafter, the same as above), the ACK/NACK may be transmitted by using an implicit resource. That is, the resource that transmits the ACK/NACK may be determined based on a lowest CCE of the PDCCH that schedules the transport block to be acknowledged/not acknowledged.

2. When $k_{default}+k_{add}$ is applied (that is, when the ACK/NACK for the data unit received in the subframe n is transmitted in the subframe $n+k_{default}+k_{add}$, hereinafter, the same as above), the ACK/NACK may be transmitted by using an explicit resource set by the RRC. When the implicit resource is used in the case where $k_{default}+k_{add}$ is applied, mapping of the CCE and the ACK/NACK resource different from the implicit resource determined in Clause 1 may be set.

In the TDD, when the ACK/NACK is transmitted, the resource allocation may be performed as follows.

1. When k(n) is applied, the ACK/NACK may be transmitted by using the implicit resource.

2. When $k_{default}+k_{add}$ is applied (for example, when k(n) of Table 4 is smaller than $k_{default}+k_{add}$), the ACK/NACK may be transmitted by using the explicit resource set by the RRC. When the implicit resource is used in the case where $k_{default}+k_{add}$ is applied, mapping of the CCE and the ACK/NACK resource different from the implicit resource determined in k(n) may be set.

Meanwhile, the present invention may be applied even to the carrier aggregation system. That is, the present invention may be applied when multiple cells are set for the user equipment. Reception timings of the PDSCH are different for each of multiple cells (alternatively, for each cell group) set for the user equipment, and as a result, multiple timing alignments (TAs) may be applied. In this case, when a specific cell becomes a monitoring cell and cross carrier scheduling is applied between the cells, the reception timings of the PDCCH are the same as each other, but the reception timings of the PDSCH may be different from each other in respective cells.

For example, cells #1, 2 and 3 are set for the user equipment and the cross carrier scheduling is set, and as a result, the PDCCHs may be received through subframe #n of the cell #1. In this case, frame synchronization is not matched among the cells #1, 2, and 3, and as a result, the TA may be performed and then, the PDSCHs in the cells #1, 2, and 3 may be received different timings. In this case, a decoding time of the PDSCH received late may be insufficient. If the ACK/NACKs for the PDSCHs received in the cells #1, 2, and 3 need to be transmitted in the uplink subframe of one cell (for example, the primary cell), a problem may occur due to the insufficient decoding time for the PDSCH received late.

In this case, the ACK/NACK for the PDSCH received late may be transmitted in not the subframe #n+$k_{default}$ but the subframe #n+$k_{default}$+$k_{add}$ by modifying and applying the present invention.

Further, the present invention may be applied even to a wireless communication system including the enhanced-PDCCH (E-PDCCH). Herein, the E-PDCCH is a control channel included in the data region in a subframe including the control region and the data region, and may be a control channel decoded through a common reference signal (CRS) common to all user equipments in the cell and a user equipment-specific reference signal.

The case of scheduling the PDSCH by the PDCCH and the case of scheduling the PDSCH by the E-PDCCH may be different from each other in a decoding start time of the PDSCH. A decoding ability may be insufficient according to the user equipment in the case of scheduling the PDSCH by setting the E-PDCCH. Even in this case, the present invention may be modified and applied. For example, in the case of scheduling the PDSCH of the subframe n by the PDCCH of the subframe n, the ACK/NACK for the PDSCH may be transmitted in the subframe n+$k_{default}$. In addition, in the case of scheduling the PDSCH of the subframe n by the E-PDCCH of the subframe n, the ACK/NACK for the PDSCH may be transmitted in the subframe n+$k_{default}$+$k_{add}$. In this case, $k_{add}$ may be determined according to an amount in which the PDSCH decoding time is decreased in terms of the user equipment.

In the aforementioned methods, a method for controlling an HARQ ACK/NACK timing according to the size of the transport block has been described.

Meanwhile, according to yet another embodiment of the present invention, the user equipment may not transmit the ACK/NACK for the transport block according to the size of the transport block. That is, when the size of the transport block is larger than predetermined X bits, the ACK/NACK is transmitted only when the size of the transport block is equal to or smaller than the X without transmitting the ACK/NACK. This method is not limited to a case based on the size of the transport block and this method includes a method in which the ACK/NACK is not transmitted when the size of the transport block is larger than a predetermined reference based on the DCI format, $I_{TBS}$ and $N_{PRB}$, and the like.

Figure 12:
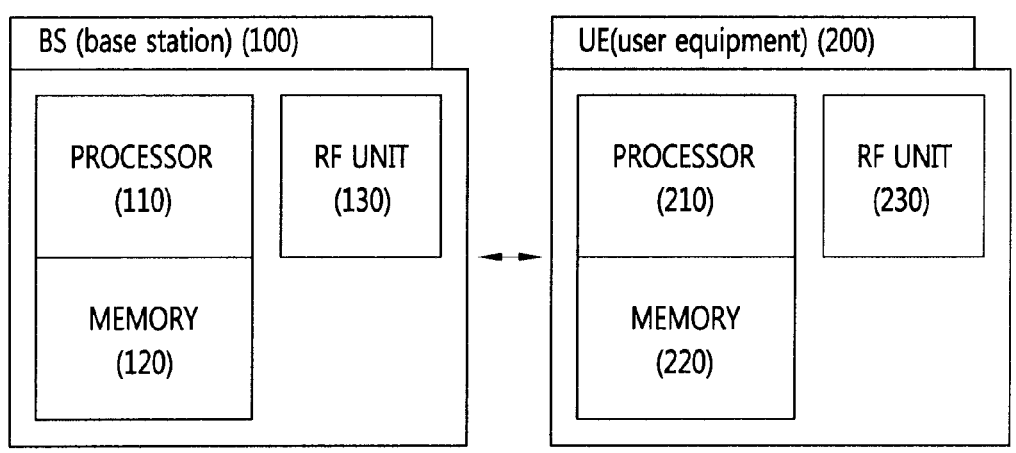
FIG. 12 is a block diagram illustrating a wireless apparatus in which the embodiment of the present invention is implemented.

FIG. 12 is a block diagram illustrating a wireless apparatus in which the embodiment of the present invention is implemented.

The base station 100 includes a processor 110, a memory 120, and a radio frequency (RF) unit 130. The processor 110 implements a proposed function, a proposed process, and/or a proposed method. For example, the processor 110 transmits a downlink grant to the user equipment and transmits downlink data such as the transport block through the radio resource allocated through the downlink grant. A subframe that receives the ACK/NACK may be determined according to the size of the transport block. Further, the processor 110 may transmit the reference value X and $k_{add}$ (alternatively, $k_{default}$+$k_{add}$) through the higher layer signal such as the RRC message. Further, the processor 110 may determine the subframe that receives the ACK/NACK according to the DCI format. The memory 120 is connected with the processor 110 to store various pieces of information for driving the processor 110. The RF unit 130 is connected with the processor 110 to transmit and/or receive a radio signal.

The user equipment 200 includes a processor 210, a memory 220, and an RF unit 230. The processor 210 implements a proposed function, a proposed process, and/or a proposed method. For example, the processor 210 may receive the transport block and transmit the ACK/NACK for the transport block by using the subframe determined according to the size of the transport block. The process of determining the subframe has been described with reference to FIGS. 8 and 9. Further, the processor 210 may determine the subframe to transmit the ACK/NACK according to the DCI format. This process has been described with reference to FIG. 10. Further, the processor 210 may receive the reference value X and $k_{add}$ (alternatively, $k_{default}$+$k_{add}$) through the higher layer signal such as the RRC message and use the received reference value X and $k_{add}$ (alternatively, $k_{default}$+$k_{add}$). The memory 220 is connected with the processor 210 to store various pieces of information for driving the processor 210. The RF unit 230 is connected with the processor 210 to transmit and/or receive a radio signal.

The processors 110 and 210 may include an application-specific integrated circuit (ASIC), other chipset, a logic circuit, a data processing device, and/or a converter that converts a baseband signal and a radio signal to each other. The memories 120 and 220 may include a read-only memory (ROM), a random access memory (RAM0, a flash memory, a memory card, a storage medium, and/or other storage device. The RF units 130 and 230 may include one or more antennas that transmit and/or receive the radio signal. When the embodiment is implemented by software, the aforementioned technique may be implemented by a module (a process, a function, and the like) that perform the aforementioned function. The module may be stored in the memories 120 and 220 and may be executed by the processors 110 and 210. The memories 120 and 220 may be present inside or outside the processors 110 and 210 and connected with the processors 110 and 210 by various well-known means.

What is claimed is:

1. A method for transmitting an acknowledgement/not-acknowledgement (ACK/NACK) of a user equipment (UE), the method comprising:
   receiving, by the UE, a first downlink control information (DCI) or a second DCI from a base station;
   receiving, by the UE, a transport block scheduled by the first DCI or the second DCI from a base station; and
   transmitting, by the UE, an ACK/NACK signal for the transport block to the base station in a first subframe or a second subframe,
   wherein if the UE has received the first DCI, the UE transmits the ACK/NACK signal in the first subframe and if the UE has received the second DCI, the UE transmits the ACK/NACK signal in the second subframe, and wherein the second subframe is later than the first subframe in a time domain.

2. The method of claim 1, wherein when a subframe receiving the transport block is subframe n, the first subframe is subframe n+4 and the second subframe is subframe n+kadd (kadd is a natural number larger than 4).

3. The method of claim 1, wherein when the first subframe is subframe n+kdefault (kdefault is any one of natural numbers of 4 or more), the second subframe is subframe n+kdefault+kadd (kadd is a natural number larger than 0).

4. The method of claim 1, wherein when the first subframe is subframe n+kdefault (kdefault is any one of natural numbers of 4 or more) and the second subframe is subframe n+kdefault+kadd, the kadd is one of a plurality of fixed values.

5. The method of claim 1,
wherein the second DCI includes a field indicating the second subframe.

6. A user equipment (UE) comprising:
a transceiver which transmits or receives a radio signal; and
a processor connected with the transceiver,
wherein the processor controls the transceiver to receive a first downlink control information (DCI) or a second DCI from a base station, receive a transport block which scheduled by the first DCI or the second DCI from the base station, and transmit an ACK/NACK for the transport block to the base station in a first subframe or a second subframe, wherein if the UE has received the first DCI, the UE transmits the ACK/NACK signal in the first subframe, and if the UE has received the second DCI, the UE transmits the ACK/NACK signal in the second subframe, and wherein the second subframe is later than the first subframe in a time domain.

7. The UE of claim 6, wherein when a subframe receiving the transport block is subframe n, the first subframe is subframe n+4 and the second subframe is subframe n+kadd (kadd is a natural number larger than 4).

8. The UE of claim 6, wherein when the first subframe is subframe n+kdefault (kdefault is any one of natural numbers of 4 or more), the second subframe is subframe n+kdefault+kadd (kadd is a natural number larger than 0).

9. The UE of claim 6, wherein when the first subframe is subframe n+kdefault (kdefault is any one of natural numbers of 4 or more) and the second subframe is subframe n+kdefault+kadd, the kadd is one of a plurality of fixed values.

10. The UE of claim 6,
wherein the second DCI includes a field indicating the second subframe.

* * * * *